US012304094B2

(12) United States Patent
Sgarra

(10) Patent No.: US 12,304,094 B2
(45) Date of Patent: May 20, 2025

(54) SHAVING INSTRUMENT

(71) Applicant: Andrew Sgarra, Chester Springs, PA (US)

(72) Inventor: Andrew Sgarra, Chester Springs, PA (US)

( * ) Notice: Subject to any disclaimer, the term of this patent is extended or adjusted under 35 U.S.C. 154(b) by 315 days.

(21) Appl. No.: 18/124,978

(22) Filed: Mar. 22, 2023

(65) Prior Publication Data

US 2024/0316808 A1 Sep. 26, 2024

(51) Int. Cl.
*B26B 21/16* (2006.01)
*B26B 21/40* (2006.01)
*B26B 21/52* (2006.01)

(52) U.S. Cl.
CPC ........ *B26B 21/165* (2013.01); *B26B 21/4075* (2013.01); *B26B 21/521* (2013.01)

(58) Field of Classification Search
CPC . B26B 21/165; B26B 21/4075; B26B 21/521; B26B 21/16; B26B 21/18
See application file for complete search history.

(56) References Cited

U.S. PATENT DOCUMENTS 2,311,913 A * 2/1943 Testi ........................ B26B 21/16 30/162
2,517,794 A 8/1950 Law
3,675,322 A 7/1972 Perry
3,740,841 A * 6/1973 Risher ...................... B26B 21/16 30/57
4,245,388 A * 1/1981 Dawidowicz ........... B26B 21/16 30/47
4,245,389 A * 1/1981 Trotta ................... B26B 21/521 30/64
4,344,226 A * 8/1982 Blake, III ............... B26B 21/10 30/55
6,473,971 B2 11/2002 Ordaz
10,538,005 B2 1/2020 Barrett et al.
2016/0144519 A1* 5/2016 Hahn ...................... B26B 21/30 30/50
2020/0269453 A1* 8/2020 Hahn ...................... B26B 21/16
2024/0316808 A1* 9/2024 Sgarra ................... B26B 21/521

* cited by examiner

*Primary Examiner* — Omar Flores Sanchez
(74) *Attorney, Agent, or Firm* — Howson & Howson LLP

(57) ABSTRACT

In a shaving instrument having one or more blades, each with a single exposed cutting, each blade is clamped between clamping parts hinged to one another in a unitary molded blade clamp. Following insertion of the blade or blades, the blade clamp is inserted into an end of an elongated slot in a head attached to a handle. The slot is shaped to allow movement of the blade clamp only along the direction of its insertion. The blades are secured against sliding in the blade clamp by engagement with protrusions formed on interior surfaces of clamping parts. The blades can be replaced when worn, but the clamping elements can be reused.

13 Claims, 6 Drawing Sheets

*Fig. 3*
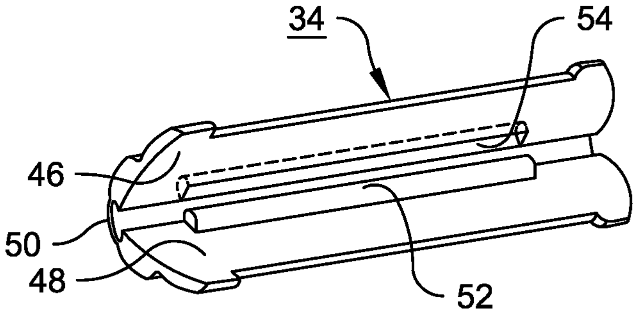
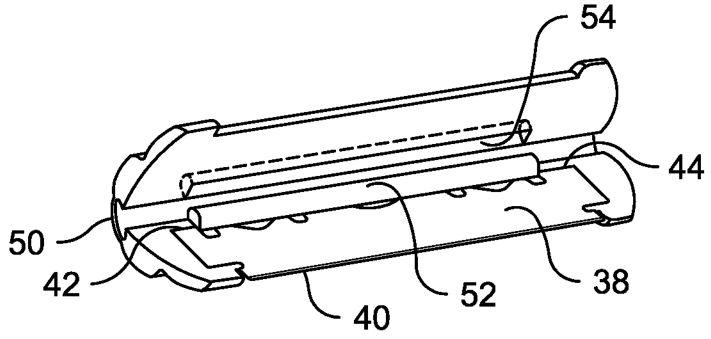
*Fig. 4*
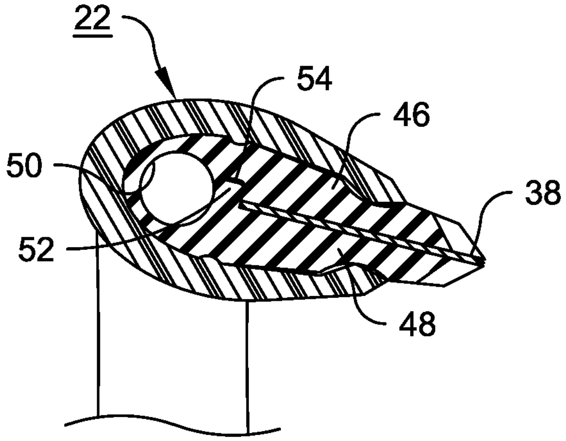
*Fig. 5*

Fig. 6
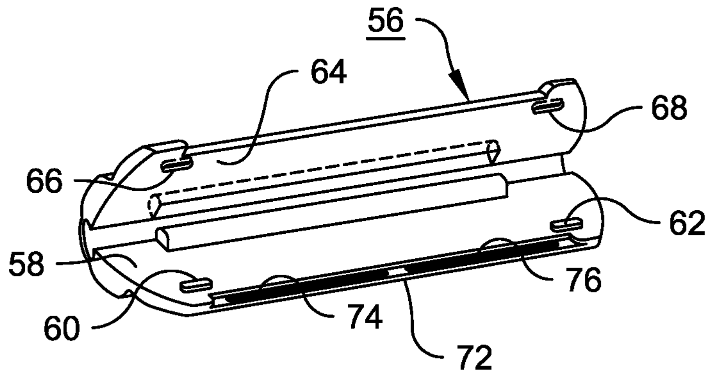
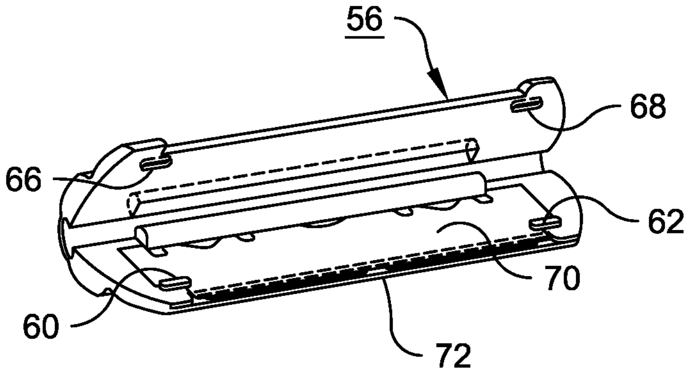
Fig. 7
Fig. 8
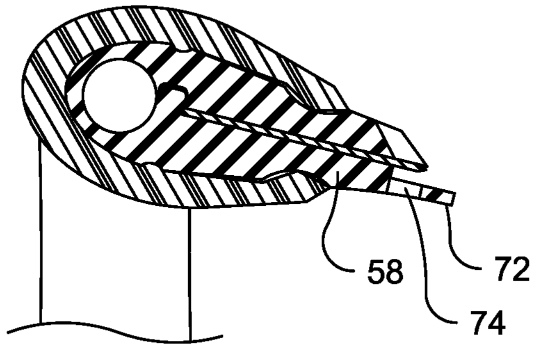

SHAVING INSTRUMENT

FIELD OF THE INVENTION

This invention relates to shaving instruments, and particularly to improvements in which a single-edged metal blade, or plural, single-edged metal blades, supplied by themselves, i.e., not as parts of cartridges including additional blade-supporting components, can be replaced quickly and easily.

BACKGROUND OF THE INVENTION

Safety razors having replaceable metal blades have been in use for many years. The typical older version of the safety razor comprises a handle fixed to a head having a blade-retaining structure that receives a double-edged blade and allows for release and replacement of the blade.

More recently, razors comprising handles with replaceable shaving heads have come into popular use. The replaceable head, usually referred to as a "cartridge," typically includes one or more single-edged blades fixed in a supporting structure that is attachable to, and removable from, a handle. A shaving kit, as sold, usually includes a handle along with several replaceable cartridges. When the cartridges supplied with the handle are used up, replacement cartridges, usually sold in kits comprising five or more cartridges, can be purchased and used with the original handle. The replacement cartridges tend to be relatively expensive compared to the double edged blades used with the earlier safety razors. Some mechanisms for connecting a cartridge to a handle have a tendency to fail after a relatively short time, making replacement of cartridges difficult or impossible. Moreover, problems will be encountered in attempts to make razors that utilize single-edged blades supplied by themselves rather than as components of cartridges. These problems are due primarily to difficulties in supporting a single edge blade in a shaving head in such a way that the blade does not move relative to the shaving head. If such movements occur, for example, as a result of pressure applied to the cutting edge of the blade during shaving, or as a result of inertia when the razor is placed on a supporting surface, a blade thus displaced can cause difficulties in shaving and also injury.

SUMMARY OF THE INVENTION

An object of this invention is to provide a simple and inexpensive shaving instrument that utilizes one or more single-edged blades supplied as such, i.e., without being embedded in a replaceable shaving cartridge. Another object is to support the blade reliably in a predetermined position in the shaving instrument. Still another object is to provide a shaving instrument in which blade replacement can be carried out quickly and easily.

A preferred shaving instrument in accordance with the invention comprises a handle, a head attached to the handle, a blade clamp removably receivable in the head, and at least one blade removably receivable in the blade clamp.

The head has two ends, and extends from one end to the other in a direction transverse to the direction in which the handle extends. The head is formed with a slot having an elongated opening extending along the direction transverse to the handle, and an end opening at least at one of its ends. The end opening is continuous with the elongated opening.

The blade clamp, which is molded from a polymeric material, is removably receivable in the slot of the head though the end opening. The blade clamp has first and second parts, hinged together at a hinge axis, and rotatable toward and away from each other about the hinge axis.

The blade is a planar metal blade having a blade-surrounding edge which includes a sharpened cutting edge. The blade is receivable between the first and second parts of the blade clamp, with its sharpened cutting edge protruding from the blade clamp.

The blade clamp includes opposable clamping portions. The clamping portions are engageable respectively with portions of the blade on opposite sides thereof adjacent the cutting edge when the first and second parts of the blade clamp are moved toward each other about the hinge axis.

The blade clamp also includes at least one protrusion on one of its clamping portions. This protrusion is adapted to engage a part of the surrounding edge of the blade in order to prevent movement of the blade relative to the blade clamp in at least one direction parallel to the plane of the blade when the opposable clamping portions are engaged with the portions of the blade adjacent its cutting edge.

The shape of the slot formed in the head of the shaving instrument is such that, when the blade clamp, with a blade received therein, is inserted into the slot, the engagement of the exterior of the blade clamp with the interior of the slot in the head prevents movement of the blade clamp in all directions other than in the direction in which the elongated opening of the slot extends.

The position of the protrusion is such that, when the blade is in engagement with the protrusion, and the blade clamp, with the blade positioned therein, is received in the slot, portions of the head press the opposable clamping portions of the blade clamp against the blade, and the cutting edge of the blade protrudes outward from the blade clamp and outward from the elongated opening of the slot.

At least in the single blade versions of the shaving instrument according to the invention, the hinge axis of the blade clamp is preferably, although not necessarily, positioned so that the blade is receivable between the first and second parts of the blade clamp with its sharpened cutting edge parallel to, but remote from, the location of the hinge axis. That is, the cutting edge of the blade is remote from the hinge axis but the edge of the blade opposite from the cutting edge is closer to the hinge axis.

The blade clamp can be provided with additional protrusions that extend from at least one of the opposable clamping portions into the space between the clamping portions. These additional protrusions engage parts of the edge of the blade at locations such that they prevent movement of the blade outward from the blade clamp. The parts of the blade-surrounding edge which these protrusions are adapted to engage are in the form of notches formed in the blade-surrounding edge. These notches are preferably located adjacent opposite ends of the sharpened cutting edge.

The blade clamp can be composed of plural elements removably connected to one another. However, the blade clamp is preferably a unitary molded part that includes the hinge and the blade-engaging clamping parts. In the case of a blade clamp adapted to accommodate two or more blades, the blade clamp can consist of upper and lower clamping parts and one or more intermediate clamping parts, connected by integrally molded hinges.

The hinge axis of the hinge that connects two clamping parts can be positioned so that a blade is receivable between those parts with its cutting edge perpendicular to, rather than parallel to, the hinge axis. Especially in the case of a blade clamp adapted to accommodate two or more blades with parallel cutting edges, the hinge axis of the hinge that connects two of the clamping parts can be positioned so that the blade is receivable between those parts of with its cutting edge perpendicular to the hinge axis. The axis of a hinge that connects clamping parts that receive another one of the blades can be parallel to the cutting edges of the blades.

The blade clamp has opposite ends spaced from each other along the direction of the cutting edge of the blade when the blade is in the blade clamp. Preferably, the blade clamp and includes an enlarged external portion at one of these opposite ends, the enlarged external portion being engageable with a portion of the head of the shaving instrument adjacent an end opening of the slot in the head. The engagement of the enlarged portion of the blade clamp with the head limits movement of the blade clamp into the slot.

In a version of the shaving instrument having first, second and third clamping portions and adapted to accommodate a first blade between the first and second clamping portions and a second blade between the second at third clamping portions, at least one of the second and third parts of the blade clamp preferably includes at least one protrusion adapted to engage a part of the blade-surrounding edge of the second blade and to prevent movement of the second blade relative to the blade clamp in at least one directions parallel to the plane of the second blade when the clamping portions of the second and third parts of the blade clamp are engaged with portions of the second metal blade adjacent the cutting edge thereof. The part of the blade-surrounding edge of the second blade which the at least one protrusion is adapted to engage is preferably in the form of a notch formed in the blade-surrounding edge of the second blade.

In a version of the blade clamp adapted to accommodate two or more blades, the parts of the blade clamp can be hinged to one another in an accordion-like manner. That is, second and third parts of the blade clamp can be hinged to each other at a hinge axis parallel to a hinge axis at which the first and second parts of the blade clamp are hinged to each other.

In an alternative version of the shaving instrument adapted to accommodate two or more blades, second and third parts of the blade clamp are hinged to each other at a hinge axis extending a direction perpendicular to an imaginary plane in which the hinge axis at which the first and second parts of the blade clamp are hinged to each other is located.

BRIEF DESCRIPTION OF THE DRAWINGS

FIG. 3 is an oblique perspective view showing the blade clamp of the first embodiment in an opened condition;

FIG. 4 is an oblique perspective view showing a blade fitting into one of the hinged parts of the blade clamp of FIG. 3;

FIG. 5 is an elevational view, partly in cross-section on surface 5-5 in FIG. 2, showing the relationship of the shaving head, the blade and the blade clamp of the first embodiment when the blade and blade clamp are in place and ready to use;

FIG. 6 is an oblique perspective view showing the blade clamp in accordance with a second embodiment in an opened condition;

FIG. 7 is an oblique perspective view showing a blade fitting into one of the hinged parts of the blade clamp of FIG. 6;

FIG. 8 is an elevational view, partly in cross-section, showing the relationship of the shaving head, the blade and the blade clamp of the second embodiment when the blade and blade clamp are in place and ready to use;

DETAILED DESCRIPTION OF THE PREFERRED EMBODIMENTS

Figure 1:
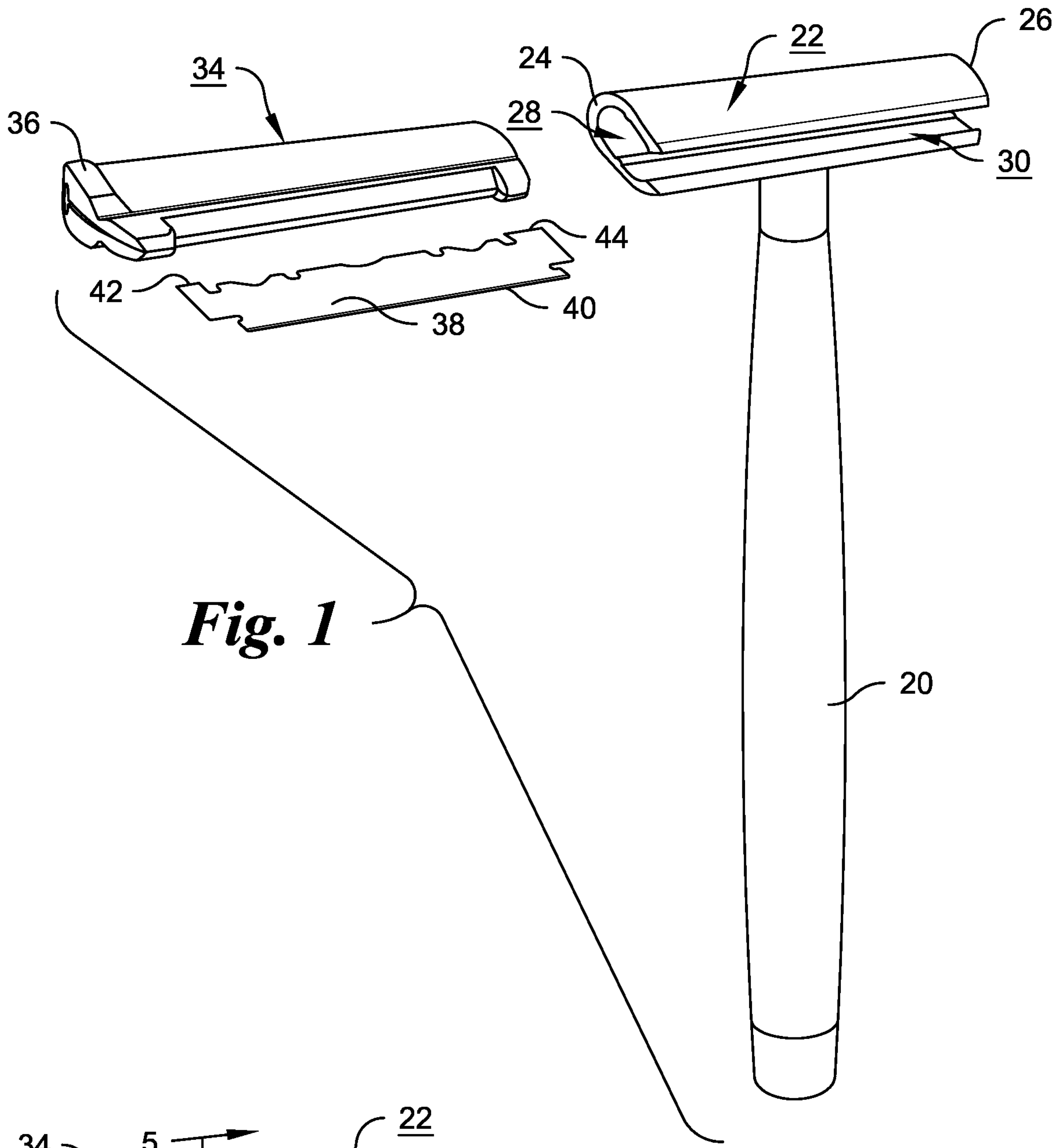
FIG. 1 is an exploded view of a first embodiment of a shaving instrument in accordance with the invention.

FIG. 1 shows an elongated handle 20 adapted to be gripped manually, and a head 22 attached in fixed relationship to the handle. The head 22 has first and second opposite ends 24 and 26, and extends from the first end 24 to the second end 26 in a direction transverse to the direction in which the elongated handle extends. The head is formed with an internal slot 28, which extends from end 24 to end 26, and has an elongated opening 30, which is continuous with end openings at the opposite ends 24 and 26.

A blade clamp 34 is slidable into slot 28 through the opening at end 24 and shaped so that it conforms to the interior wall of the slot 28 and, when inserted, is prevented from movement in directions other than along the direction of its insertion. In the embodiment shown in FIG. 1, the shapes of the interior wall of slot 28 and the exterior of the blade clamp are such that the thickness of a portion of the exterior of the blade clamp is greater than the width of the elongated opening 30, and this relationship prevents the blade clamp from moving in directions other than along the direction of its insertion. It is, of course, possible to prevent movement of the blade clamp in these other directions by other means, such as mating slots and protrusions formed on exterior of the blade clamp and the interior of the slot.

The blade clamp is formed with an enlargement 36 at one of its ends for engagement with end 24 of the head when the blade clamp is fully inserted. This engagement prevents further movement of the blade clamp in the direction of insertion. Frictional engagement of the exterior of the blade clamp 34 with the interior wall of the slot 28 resists movement of the blade clamp in the direction opposite to the direction of its insertion, but allows removal of the blade clamp by the exertion of a pulling force when enlargement 36 is grasped manually.

The blade clamp 34 is configured to receive and hold a metal blade 38 in such a way that a cutting edge 40 of the blade is exposed, extending outward from the blade clamp and through the elongated opening 30 of slot 28. As seen in FIG. 1, the blade 38 has a planar upper surface. The blade also has a corresponding planar lower surface, and is shaped with portions 42 and 44 adjacent opposite ends of its rear edge that extend rearward slightly beyond the intermediate portion of the rear edge. The intermediate portion of the rear edge of the blade shown in FIG. 1 has an irregular shape due to the fact that, for convenience, the blade is made by cutting a conventional double-edged razor blade, having an irregularly shaped central opening, into two equal parts. This irregular shape at the rear edge of the blade can be avoided if the single-edged blade is specially manufactured.

Figure 2:
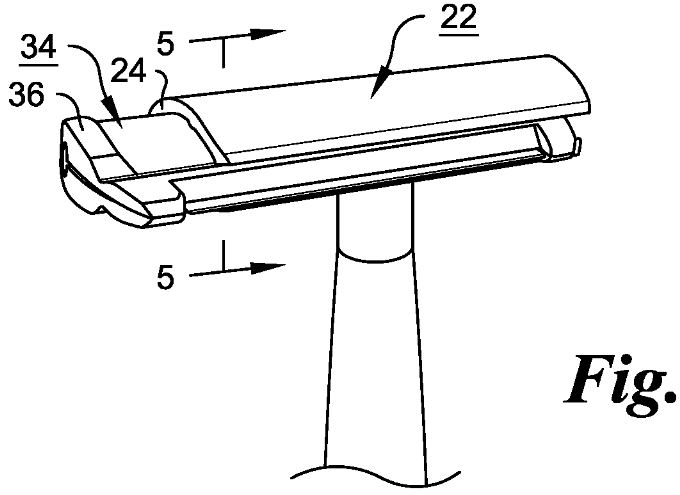
FIG. 2 is an oblique perspective view of the first embodiment, showing the blade clamp, with a blade fitted therein, partially inserted into a clamp-receiving head secured to a handle.

FIG. 2 shows blade clamp 34, with the blade 38 fitted therein, partially inserted into the clamp-receiving head 22. When the blade clamp is fully inserted, the enlargement 36 will engage end 24 of the head, preventing further movement of the blade clamp in the direction if its insertion.

The blade clamp 34 of FIGS. 1 and 2 is a unitary molded part, preferably composed of a polymer such as polypropylene.

As shown in FIG. 3, the blade clamp 34 has an upper part 46 and a lower part 48, connected to each other by a connecting part 50. Because it is thinner than the upper and lower parts, the connecting part 50 is more flexible, and serves as a hinge, allowing the upper and lower parts to separate from each other. The lower part 48 is formed with a protrusion in the form of a lengthwise extending ridge 52 adjacent the connecting part 50, and the upper part 46 is formed with an elongated slot 54, shaped and positioned so that it receives the ridge 52 when the upper and lower parts are brought together.

As shown in FIG. 4, the length of ridge 52 is equal to the distance between portions 42 and 44 of blade 38. Engagement of portions 42 and 44 with the ends of ridge 52 prevent movement of the blade in directions parallel to its cutting edge 40. Parts of the rear edge of the blade between portions 42 and 44 engage the ridge 50, and this engagement secures the blade against inward movement in a direction perpendicular to its cutting edge. In this embodiment outward movement of the blade is prevented by frictional engagement of the blade with the opposing inner faces of the upper and lower parts 46 and 48 of the blade clamp when these faces are held in engagement with the blade as shown in FIG. 5.

In the second embodiment of the invention, shown in FIGS. 6, 7 and 8, the blade clamp 56 is similar to the blade clamp in the first embodiment, but differs in two respects.

First, as shown in FIG. 6, the lower part 58 of the blade clamp has protrusions 60 and 62 adjacent its opposite ends, and the upper part 64 has two recesses 66 and 68, arranged to receive protrusions 60 and 62 respectively when the blade clamp is closed. As shown in FIG. 7, the protrusions engage notches formed at the corners of the blade 70 adjacent the opposite ends of the cutting edge of the blade. The engagement of the protrusions with the notches prevents the blade from moving outward from the blade clamp in the direction in which the cutting edge faces, and it is not necessary in this embodiment to rely upon friction to prevent outward movement of the blade. The engagement of the protrusions 60 and 62 with the notches adjacent the ends of the cutting edge of the blade also assists in preventing movement of the blade in directions parallel to the cutting edge.

The second feature by which the blade clamp 56 differs from the blade clamp of the first embodiment is the bridge 72 formed on the lower part of the blade clamp 56, as shown in FIG. 8. The bridge is functionally similar to a bridge on a conventional razor. It facilitates shaving by pressing and spreading the skin before it is reached by the cutting edge of the blade. Elongated openings 74 and 76, between the bridge and the main portion of the lower part 58 of the blade clamp facilitate the clearing of shaving cream during shaving. The formation of the bridge on the removable blade clamp instead of on the razor head enables the bridge to be positioned close to the cutting edge of the blade for optimum performance.

Figure 9:
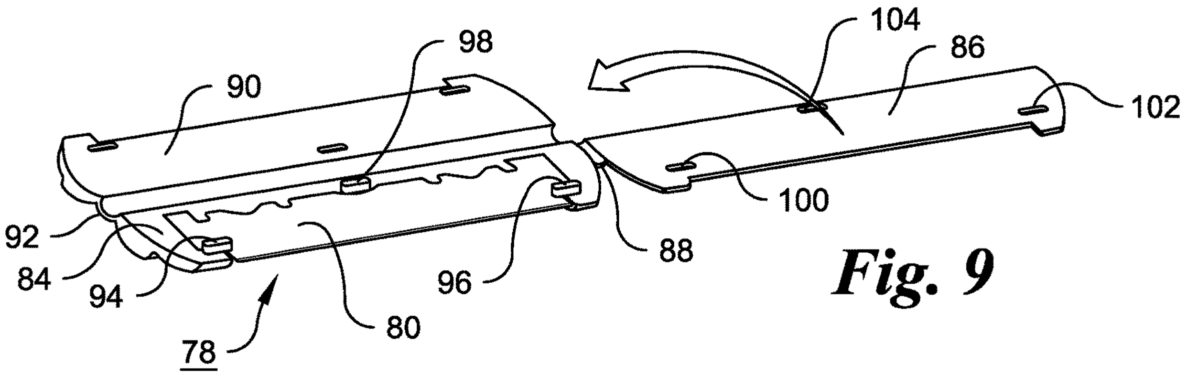
FIG. 9 is a perspective view showing a first of two blades, the first blade being partially installed in a blade clamp in accordance a third embodiment of the invention.
Figure 10:
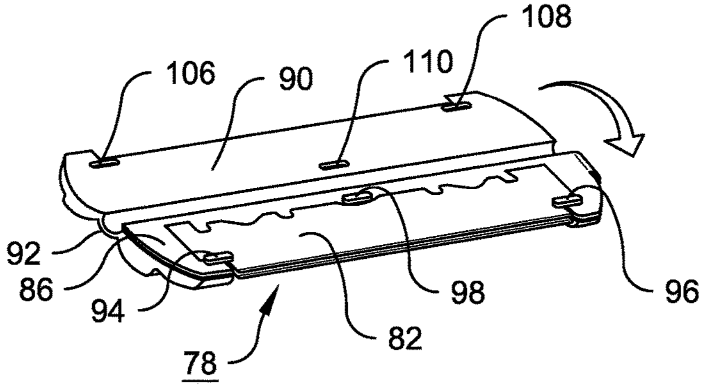
FIG. 10 is a perspective view showing a second blade partially installed in the blade clamp of FIG. 9.
Figure 11:
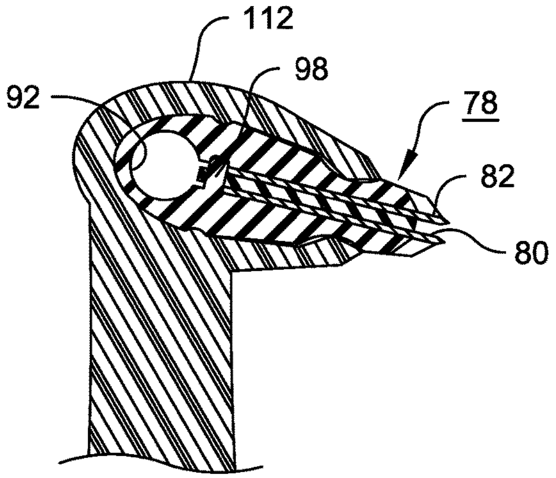
FIG. 11 is a cross-sectional view showing the relationship of the shaving head, the blades and the blade clamp of the third embodiment when the blades and blade clamp are in place and ready to use.

The third embodiment, shown in FIGS. 9, 10 and 11, utilizes a unitary molded blade clamp 78 that accommodates two blades 80 and 82. The blade clamp comprises a lower part 84, an intermediate part 86 hinged to one end of the lower part by a thin connecting part 88, and an upper part 90 hinged to the lower part 84 by a thin connecting part 92 that extends along the back of the blade clamp. Connecting part 92 is similar to connecting part 50 in FIGS. 3, 4 and 5, but should be slightly wider in order to accommodate increased thickness of the blade clamp.

As shown in FIG. 9, in the assembly process, a first blade 80 is placed on the lower part 84 of the blade clamp. This blade is held against sliding movement by protrusions 94, 96 and 98, which extend upward from part 84. The intermediate part 86 is then folded over so that it engages the upper surface of blade 80. The protrusions extend through holes 100, 102 and 104 in part 86. As shown in FIG. 10, the second blade 82 is then set in place on part 86 and is held against sliding by protrusions 94, 96 and 98. Upper part 90 of the blade clamp is then folded over and engaged with the upper surface of blade 82. When part 90 is folded over, protrusions 94, 96 and 98 are received in recesses 106, 108 and 110 respectively.

FIG. 11 shows the resulting two-blade razor, in which the blade clamp 78 is fitted into a slot in razor head 112, and the cutting edges of the two blades are in parallel relationship. Optionally, this blade clamp can be configured so that the cutting edge of one of the blades is recessed relative to the cutting edge of the other blade.

Figure 12:
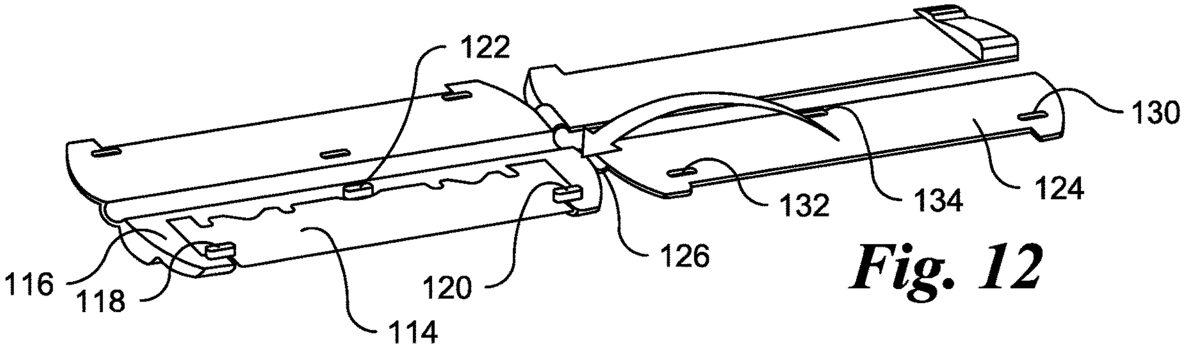
FIG. 12 is a perspective view showing a first blade partially installed in a blade clamp in accordance a fourth embodiment of the invention.
Figure 13:
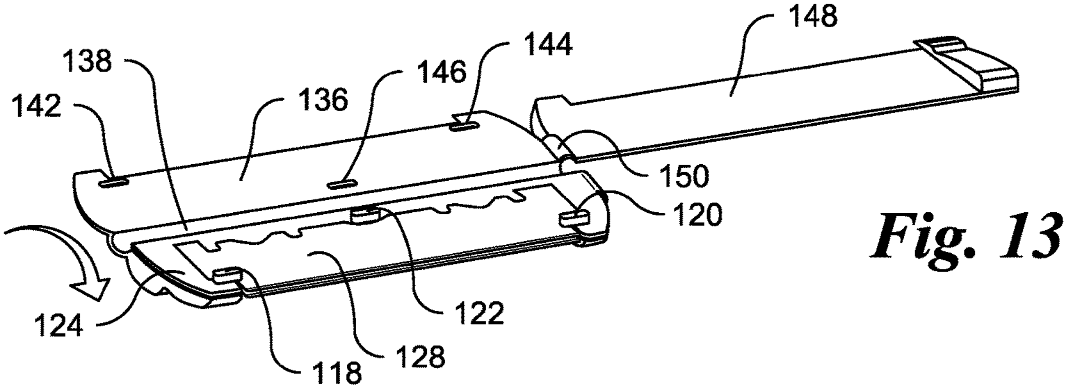
FIG. 13 is a perspective view showing a second blade partially installed in the blade clamp of FIG. 12.
Figure 14:
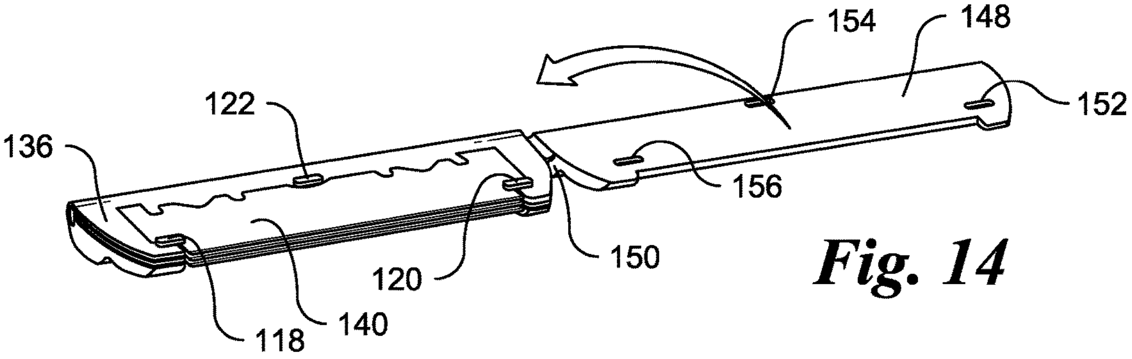
FIG. 14 is a perspective view showing a third blade partially installed in the blade clamp of FIG. 12.

In the three-blade version of the shaving instrument, as shown in FIGS. 12, 13 and 14, the blade clamp is composed of four parts. A blade 114 is placed on a lower part 116 and held against sliding by protrusions 118, 120 and 122 as in the two-blade version shown in FIG. 9.

A second clamp part 124, hinged to the lower part 116 by a thin connecting part 126, is then folded over so that it is positioned on top of blade 114, as shown in FIG. 13. A second blade 128 is then placed on top of part 124 and held against sliding by protrusions 118, 120 and 122, which extend respectively through openings 130, 132 and 134 (shown in FIG. 12).

A third clamp part 136, hinged to the rear edge of part 116 by an elongated narrow connecting part 138, is then folded over so that it is positioned on top of blade 128. A third blade 140 is then placed on top of clamp part 136 as shown in FIG. 14, and held against sliding by protrusions 118, 120 and 122, which also protrude respectively through openings 142, 144 and 146 in clamp part 136.

As shown in FIG. 14, a fourth clamp part 148, hinged to part 136 by a thin connecting part 150, is folded over to cover blade 140. The ends of protrusions 118, 120 and 122 are received respectively in depressions 152, 154 and 156. The assembled blade clamp with the three blades is then inserted into a clamp-receiving head similar to head 22 in FIG. 5 and head 112 in FIG. 11.

Figure 15:
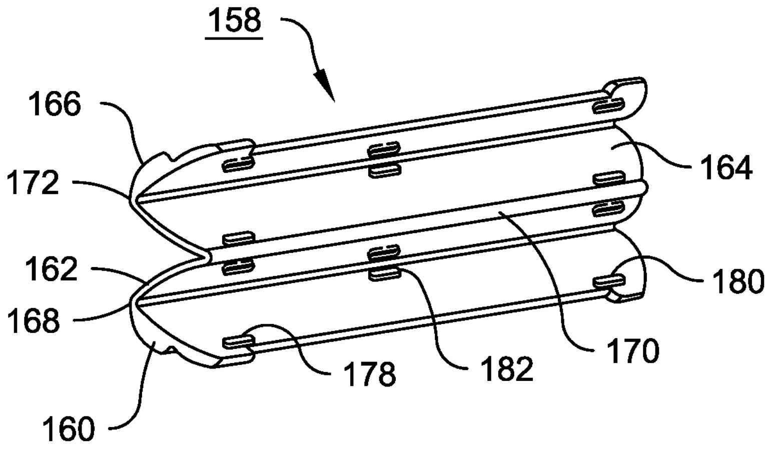
FIG. 15 is a perspective view of a blade clamp in accordance with a fifth embodiment of the invention.

Another version of a two-blade blade clamp is shown in FIG. 15. Here the blade clamp 158 is an integrally molded unit comprising four layers, 160, 162, 164 and 166, hinged together by elongated connecting elements, all in parallel relation to one another.

Figure 16:
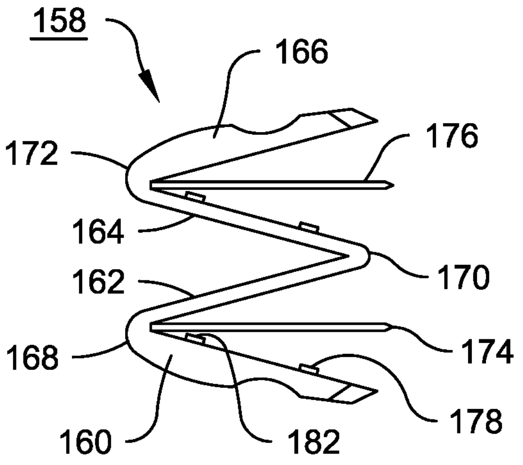
FIG. 16 is an elevational view illustrating the loading of two blades into the blade clamp of the fifth embodiment.

The bottom layer 160 is hinged to a second layer 162 by a connecting element 168 along the rear edges of layers 160 and 162. The second layer 162 is hinged to the third layer 164 by a connecting element 170 extending along the front edges of layers 162 and 164. Third layer 164 is hinged to the fourth later 166 by a connecting element 172 extending along the rear edges of layers 164 and 166. This blade clamp can be expanded and contracted in an accordion-like manner. When this blade clamp is in the expanded condition, as shown in FIG. 16, blade 174 is inserted between layers 160 and 162 and blade 176 is inserted between layers 164 and 166. The blade 172 is prevented from sliding by engagement with protrusions 178, 180 and 182 as in the embodiments depicted in FIGS. 9-14, and blade 174 is prevented from sliding by engagement with similar protrusions. When the blade clamp is compressed against the blades, it can be inserted into a head similar to the razor heads shown in FIGS. 5, 8 and 11. Enlargements 176 and 178, on the exterior of the blade clamp, at one end of each of the lower and upper layers 160 and 166, limit movement of the blade clamp into the razor head as in the previously described embodiments.

Figure 17:
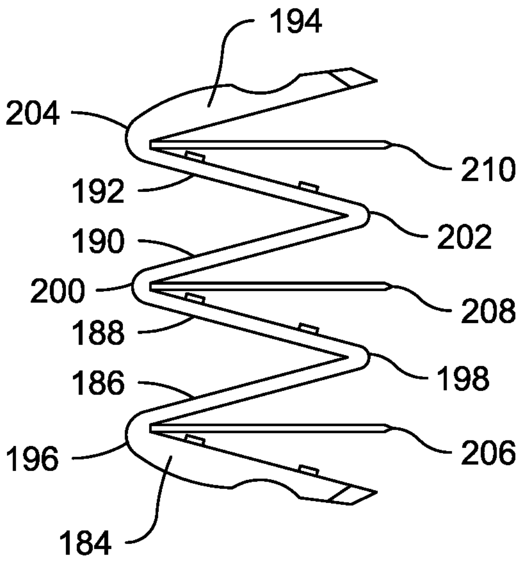
FIG. 17 is an elevational view illustrating the loading of three blades into a blade clamp in accordance with a sixth embodiment of the invention.

The embodiment shown in FIG. 17 is a blade clamp similar to the one shown in FIGS. 15 and 16, but designed to accommodate three blades. It is composed of six layers 184-194, with adjacent layers integrally hinged together by flexible connecting elements 196, 198, 200, 202 and 204. Blade 206 is located between layers 184 and 186, blade 208 is located between layers 188 and 190, and blade 210 is located between layers 192 and 194. The blades are held against sliding by protrusions similar to those in the embodiment of FIGS. 15 and 16, and when the blade clamp is compressed against the blades, the assembly is inserted into a slotted razor head similar to the slotted razor head in FIGS. 5, 8 and 11.

The shaving instruments in accordance with the invention have a number of advantages over prior shaving instruments. One advantage, which applies to all of the embodiments described above, is that the instruments utilize single-edged blades, which are supplied without being permanently incorporated into cartridges. When the cutting edges of the blades become dull through wear, only the metal blades need to be replaced. The blade clamps can be reused, and only need to be replaced when worn or damaged.

Another advantage of the invention results from the use of blade clamps with clamping portions that are in the form of integrally molded units having plural clamping parts that are hinged together so that they can be readily opened and closed to facilitate blade replacement.

Still another advantage of the invention results from the use of protrusions which are integral parts of the blade clamps, and which engage blades in such a way as to limit, or prevent, sliding movement of the blades relative to the blade clamps.

Modifications of various kinds can be made to the instruments described herein. For example, blade clamps that accommodate four or more blades can be made using additional clamping layers that are integrally hinged to clamping adjacent layers. The sizes, shapes and other characteristics of the blade clamps, the blades, and the clamp-receiving heads can also be modified without departing from the scope of the invention as defined in the following claims.

What is claimed is:

1. A shaving instrument comprising:
a handle extending in a first direction;
a head attached to the handle, said head having two ends, and extending from one of said ends to the other in a second direction transverse to said first direction, said head also having a slot with an elongated opening extending along said second direction and an end opening at least at one of said ends, said end opening being continuous with said elongated opening;
a blade clamp removably receivable in said slot though said end opening, said blade clamp being molded from a polymeric material and having first and second parts hinged together at a hinge axis and rotatable toward and away from each other about said hinge axis; and
a planar metal blade having a blade-surrounding edge, said edge including a sharpened cutting edge and being receivable between said first and second parts of the blade clamp with its sharpened cutting edge protruding from the blade clamp;
wherein said blade clamp includes opposable clamping portions engageable respectively with portions of said metal blade on opposite sides thereof adjacent said cutting edge, when the first and second parts of the blade clamp are moved toward each other about said hinge axis, and at least one protrusion on one of said clamping portions, said protrusion being adapted to engage a part of said blade-surrounding edge and thereby prevent movement of the blade relative to the blade clamp in at least one direction parallel to the plane of the blade when said opposable clamping portions are engaged with said portions of said metal blade adjacent said cutting edge;
wherein the shape of said slot is such that, when the blade clamp, with said blade received therein, is received in said slot, the engagement of the exterior of the blade clamp with the interior of said slot prevents movement of the blade clamp in all directions other than in said second direction; and
wherein the position of said protrusion is such that, when said blade is in engagement with the protrusion, and the blade clamp, with the blade positioned therein, is received in said slot, portions of said head press the opposable clamping portions of the blade clamp against the blade and the cutting edge of said blade protrudes outward from said blade clamp and outward from the elongated opening of said slot.

2. The shaving instrument according to claim 1, in which the hinge axis of the blade clamp is positioned so that said blade is receivable between said first and second parts of the blade clamp with its sharpened cutting edge parallel to, but remote from, the location of said hinge axis.

3. The shaving instrument according to claim 1, including additional protrusions extending into the space between said opposable clamping portions, from at least one of said clamping portions and adapted to engage parts of the blade-surrounding edge at locations such that they prevent movement of the blade outward from the blade clamp, and in which said parts of the blade-surrounding edge which said protrusions are adapted to engage are in the form of notches formed in said blade-surrounding edge.

4. The shaving instrument according to claim 1, including additional protrusions extending into the space between said opposable clamping portions, from at least one of said clamping portions and adapted to engage parts of the blade-surrounding edge at locations such that they prevent movement of the blade outward from the blade clamp, and in which said parts of the blade-surrounding edge which said protrusions are adapted to engage are notches formed in said blade-surrounding edge at locations adjacent opposite ends of said sharpened cutting edge.

5. The shaving instrument according to claim 1, in which said blade clamp is a unitary molded part.

6. The shaving instrument according to claim 1, in which the hinge axis of the blade clamp is positioned so that said blade is receivable between said first and second parts of the blade clamp with its sharpened cutting edge perpendicular to said hinge axis.

7. The shaving instrument according to claim 1, in which said blade clamp has opposite ends spaced from each other along the direction the cutting edge of said blade when the blade is received between said first and second parts of the blade clamp, and includes an enlarged external portion at one of said opposite thereof, said enlarged external portion being engageable with a portion of said head adjacent said end opening for limiting movement of said blade clamp into said slot.

8. The shaving instrument according to claim 1, in which said blade clamp includes a third part hinged to said second part, in which said second and third parts have opposable clamping portions for engaging a second planar metal blade, and including a second planar metal blade having a blade-surrounding edge, said edge of the second blade includes a sharpened cutting edge, and said second blade is receivable between said second and third parts of the blade clamp with its sharpened cutting edge protruding from the blade clamp, with the sharpened cutting edges of both cutting blades in parallel relationship to each other.

9. The shaving instrument according to claim 8 in which said second and third clamping portions of said blade clamp have opposable clamping portions engageable with portions of said second metal blade adjacent the sharpened cutting edge thereof, and in which at least one of said second and third parts of said blade clamp includes at least one protrusion adapted to engage a part of the blade-surrounding edge of said second blade and to prevent movement of said second blade relative to the blade clamp in at least one directions parallel to the plane of the second blade when said opposable clamping portions of the second and third parts of the blade clamp are engaged with said portions of said second metal blade adjacent the cutting edge thereof.

10. The shaving instrument according to claim 9, in which the part of the blade-surrounding edge of said second blade which said at least one protrusion is adapted to engage is in the form of a notch formed in said blade-surrounding edge of said second blade.

11. The shaving instrument according to claim 8, in which second and third parts of the blade clamp are hinged to each other at a hinge axis parallel to the hinge axis at which the first and second parts of the blade clamp are hinged to each other.

12. The shaving instrument according to claim 8, in which second and third parts of the blade clamp are hinged to each other at a hinge axis extending a direction perpendicular to an imaginary plane in which the hinge axis at which the first and second parts of the blade clamp are hinged to each other is located.

13. A shaving instrument comprising:

a handle extending in a first direction;

a head attached to the handle, said head having two ends, and extending from one of said ends to the other in a second direction transverse to said first direction, said head having a slot with an elongated opening extending along said transverse direction and an end opening at least at one of said ends, said end opening being continuous with said elongated opening;

a blade clamp removably receivable in said slot though said end opening, said blade clamp being molded from a polymeric material and having first and second parts hinged together at a hinge axis and rotatable toward and away from each other about said hinge axis;

a planar metal blade having a blade-surrounding edge, said edge including a sharpened cutting edge, said blade being receivable between said first and second parts of the blade clamp with its sharpened cutting edge protruding from the blade clamp;

wherein said blade clamp includes opposable clamping portions engageable with portions of said metal blade adjacent said cutting edge when the first and second parts of the blade clamp are moved toward each other about said hinge axis;

wherein the size of said slot is such that portions of said head press the opposable clamping portions of the blade clamp against the blade when the blade clamp, with the blade positioned therein, is received in said slot, and such that the cutting edge of the blade protrudes outward from said elongated opening of said slot; and wherein the size of the blade clamp is such that a portion of the blade clamp extends along the exterior of said elongated opening of said slot when the blade clamp is received in said slot.

* * * * *